INVENTOR.
CHARLES A. LAVERY
BY Arthur R Wade
ATTORNEY

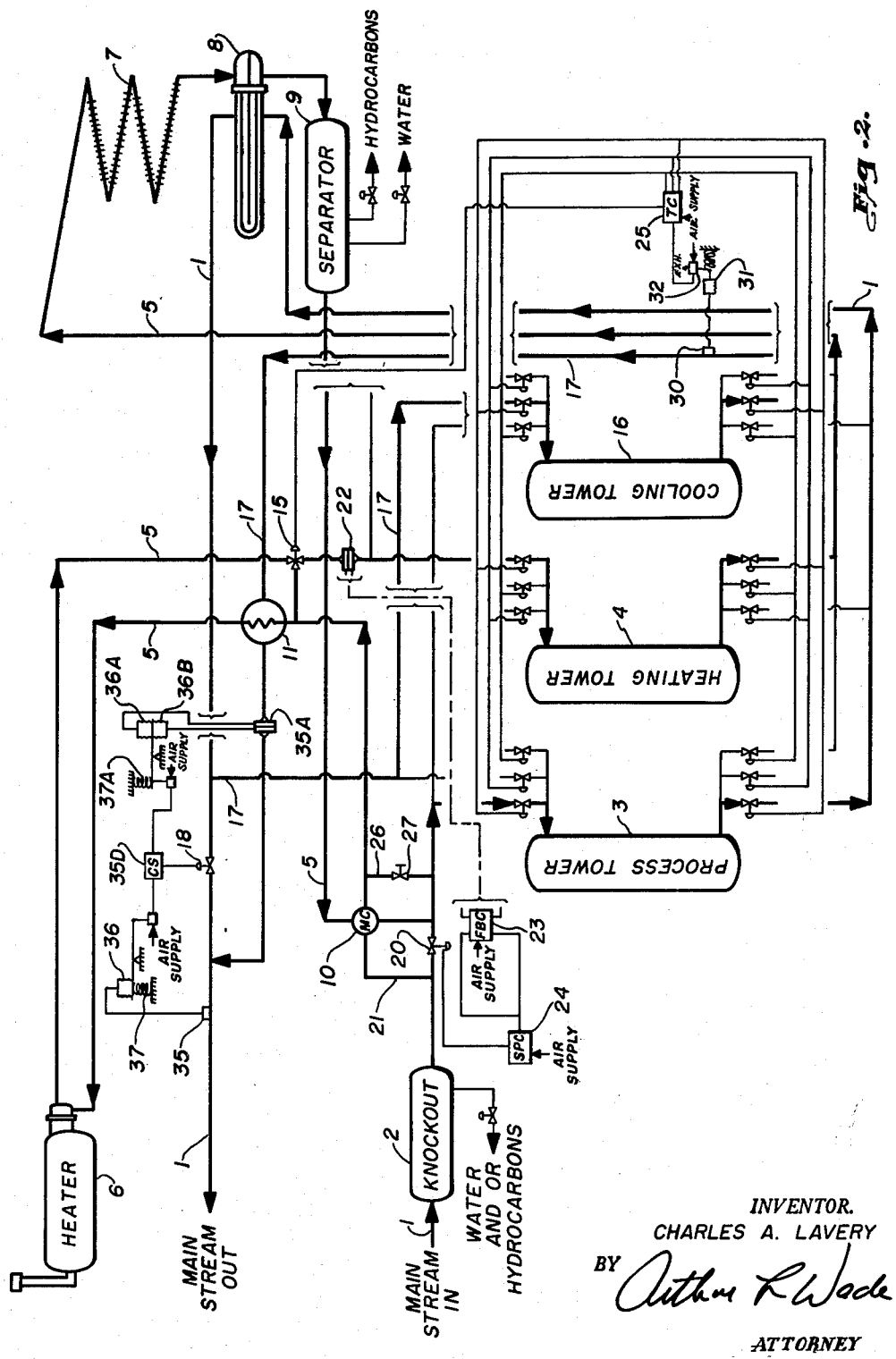

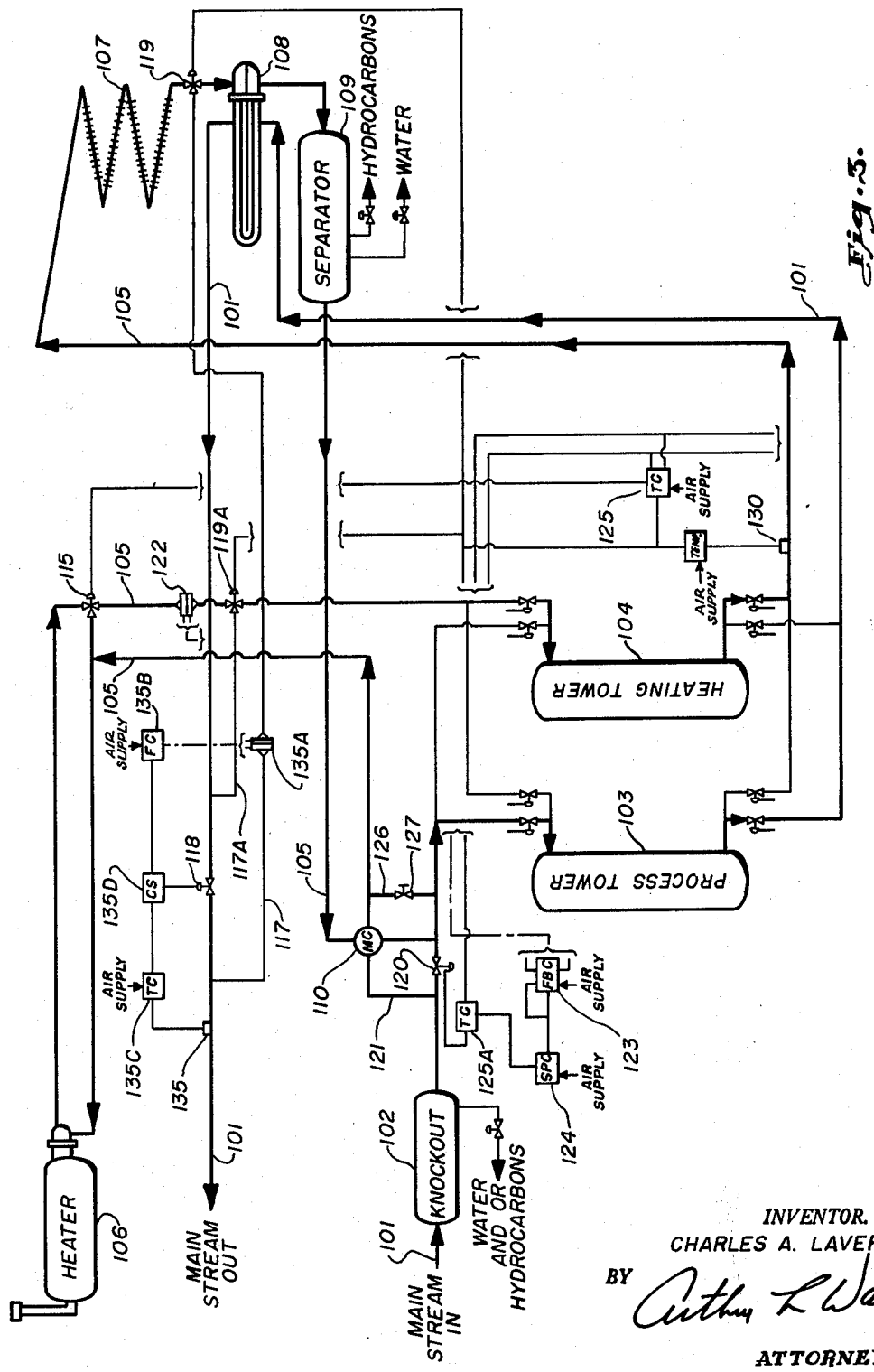

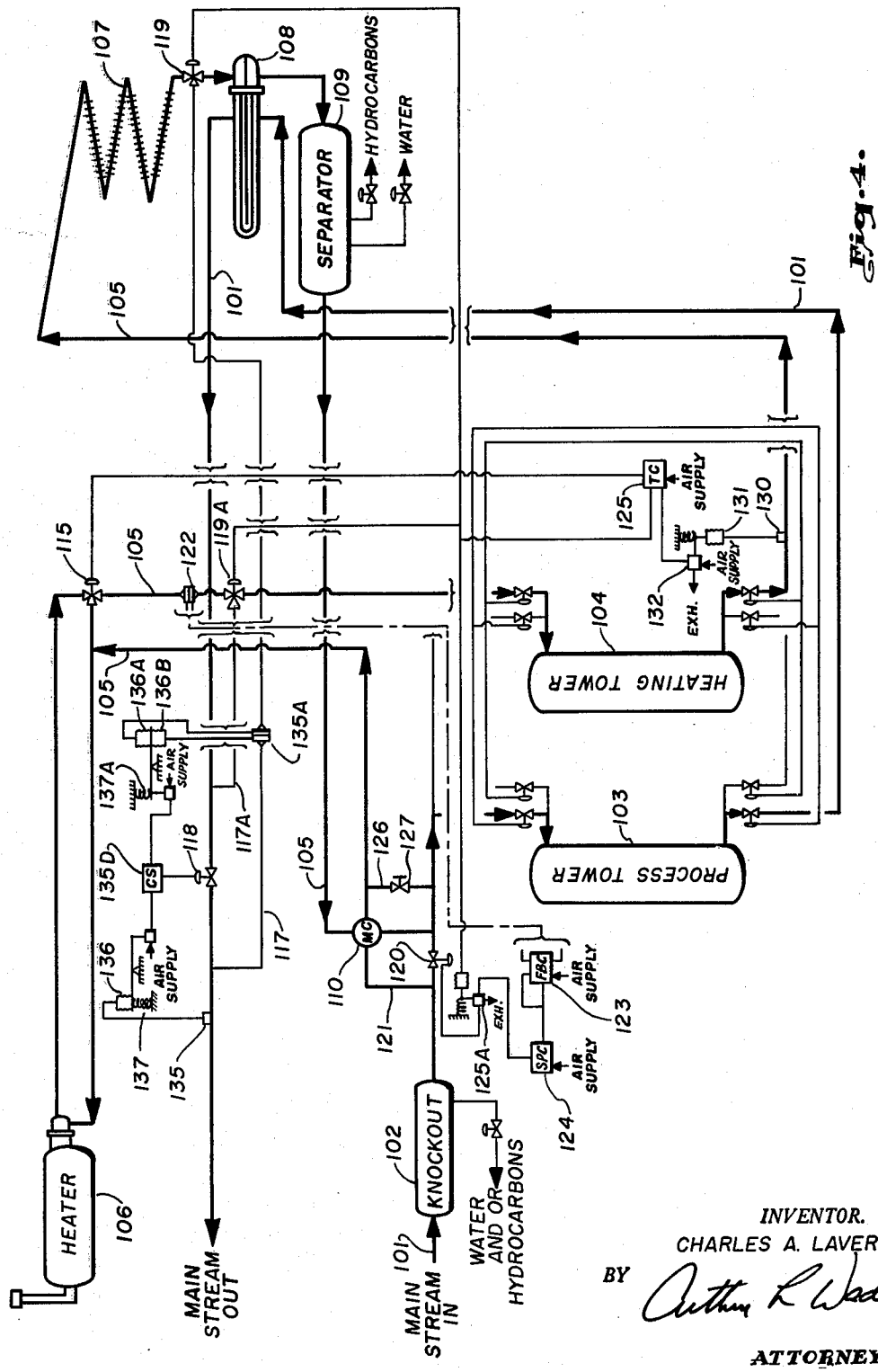

3,124,438
PROCESS AND APPARATUS FOR RECOVERING
HYDROCARBON FROM GAS STREAMS
Charles A. Lavery, Tulsa, Okla., assignor to National
Tank Company, Tulsa, Okla., a corporation of Nevada
Filed Dec. 16, 1960, Ser. No. 76,191
22 Claims. (Cl. 55—20)

This invention relates to regeneration of a bed of dry desiccant used to adsorb selected components from a stream of natural gas. More specifically, the invention relates to utilizing a portion of the processed natural gas for cooling the bed before the bed is returned to adsorbing service.

It is presently common to establish a circuit of gas in a closed circuit and recycle the gas through a bed of adsorbent material to drive off constituents the bed has adsorbed from a main stream of natural gas. The gas in the closed circuit is heated in order to vaporize the constituents from the bed. The heated regenerating gas is then reduced in temperature by some available source of coolant until the selected components are condensed and removed from the regeneration gas stream as liquid.

It is common to turn off, or bypass, the heater for the regeneration gas stream in order that this recycled regeneration gas can be used to reduce the temperature of the bed before it is returned to adsorption service. However, the bed will start to adsorb recoverable components from the regeneration gas stream as the bed cools. The bed, so pre-loaded with sorbate, will have its adsorptive capacity, relative to the main stream to be processed, reduced. Also, the alternate heating and cooling of the regeneration stream requires a large change in inventory to keep the pressure differential it has with the main stream small enough to prevent damage to the bed, or disruption to the process, as the bed is shifted in its contact with the streams. Finally, this double use of the regeneration stream, for both heating and cooling, limits the time of the complete regeneration cycle to that time needed for the completion of both these functions in series.

A principal object of the present invention is to use at least a portion of the processed main gas stream to reduce the temperature of the heated bed and transfer heat at a controlled rate from the portion of the processed main gas stream to the gas stream used to vaporize the condensable components from the bed.

The present invention contemplates a system which adsorbs water and condensable hydrocarbons from a stream of natural gas with a bed of adsorbent material. After the bed has processed the stream of natural gas, the bed is first heated by a reactivation flow stream and then cooled by a regulated portion of the processed stream. The regulated cooling portion of the processed stream is returned to the processed stream through a heat exchanger with which heat is transferred to the reactivation flow stream. The size of the cooling portion of the processed stream is established by a regulator.

The present invention contemplates the regulator for the cooling portion of the processed stream being a time-cycle controller calibrated to flow the portion at a rate which is compatible with the design capacity of the heat exchanger. The capacity of the bed and the circuit connecting the units with the processed stream.

The present invention also contemplates the regulator being responsive to the flow of the cooling portion of the processed stream and the fluid temperature of the processed stream after the cooling portion has been returned to it. The flow index is utilized to maintain a rate compatible with the design capacity of the heat exchanger, the capacity of the bed and the circuit connecting the units with the processed stream while the temperature index is utilized as a final limit to the flow rate.

Other objects, advantages and features of this invention will become apparent to one skilled in the art upon consideration of the written specification, appended claims, and attached drawings wherein;

FIG. 2 is the system of FIG. 1 with the control features of FIG. 1 illustrated in greater detail;

FIG. 3 is a diagrammatic and schematic representation of a system, having two beds of desiccant, embodying the invention; and FIG. 4 is the system of FIG. 3 with the control features of FIG. 3 shown in greater detail.

GENERAL PLAN OF THE DISCLOSURE

Figure 1:
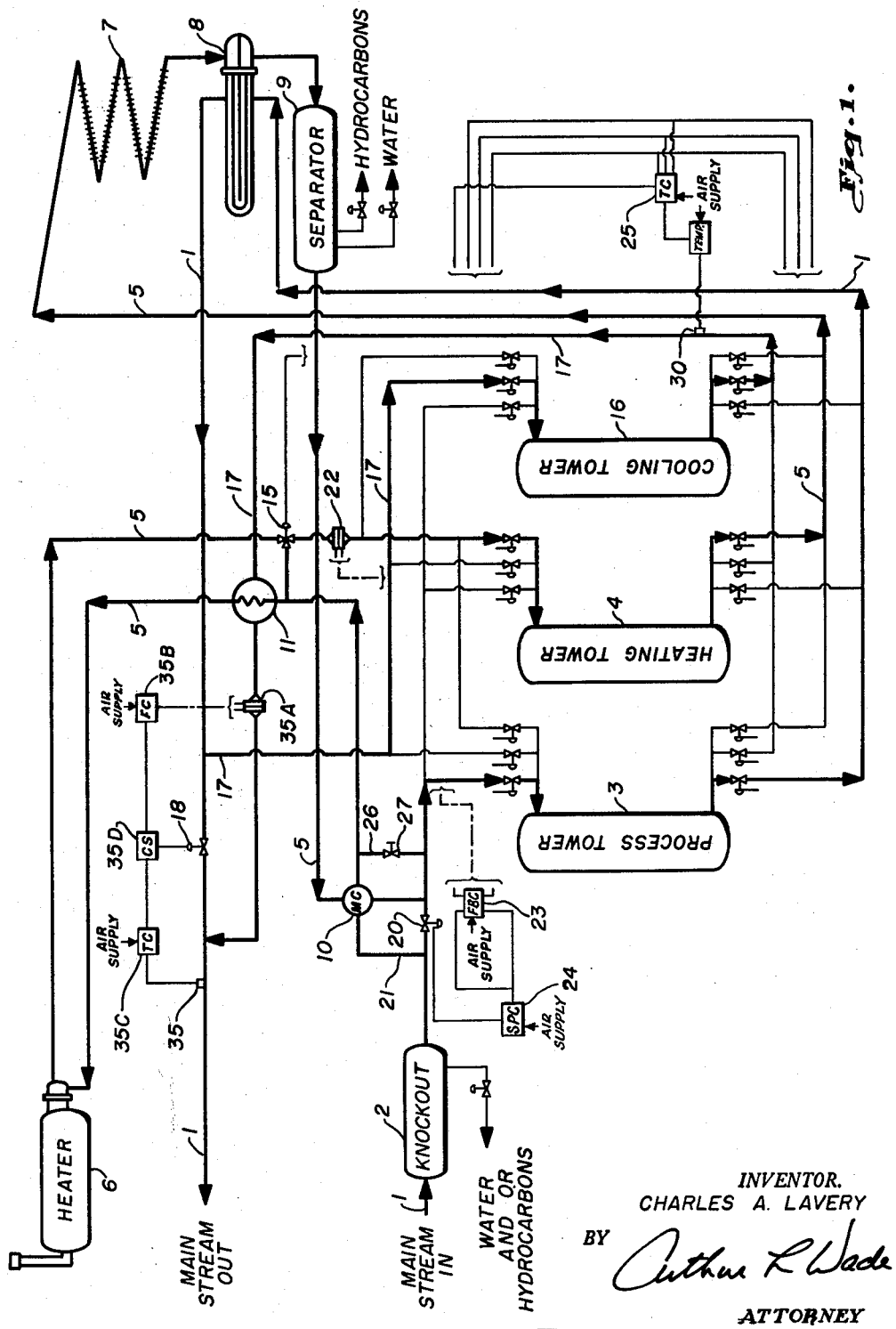
FIG. 1 is a diagrammatic and schematic representation of a system, having three beds of desiccant, embodying the invention.

There are two basic difficulties in disclosing the preferred embodiment of the present invention. Although the system in which the invention is embodied is represented both diagrammatically and schematically, for simplicity, the drawings of the conduits interconnecting the various pieces of apparatus form a maze of lines in which the process is difficult to follow without exhaustive study. Secondly, the instrumentation and control apparatus is also complex, even when considered separately from the conduits. Placing both the process conduits and the control piping on the same diagram is very difficult to do with clarity.

To solve the first problem of representation, a first drawings has been made of the process conduits with the locations of the instrumentation and control apparatus indicated with relative simplicity. To meet the second problem, a second drawing has been made which shows the measuring and control apparatus in greater detail, interconnected to carry out their function. In making the instrumentation and control connections continuous, the conduits of the process have been broken at points which appear desirable to give clarity.

FIGS. 1 and 2, then, are to be considered together in illustrating the process conduits and the instrumentation and control piping for a three-bed system utilizing the present invention. FIGS. 3 and 4 are to be taken together to illustrate a two-bed system.

THREE-BED SYSTEM

*The Process—Adsorption*

FIG. 1 is a flow diagram of a system employing a dry desiccant to process a stream of natural gas. The stream is brought to the process by means of conduit 1. The various pieces of processing apparatus are included in this conduit 1 receiving its stream. After the processing, this main stream of gas is removed through conduit 1. The first piece of apparatus, shown as included in conduit 1, is an inlet separator, or knockout 2. At a particular temperature and particular pressure, a specific stream of natural gas to be processed may have liquids mechanically entrained therein. Knockout 2 is designed to mechanically scrub these mechanically entrained liquids, generally classified as water and/or hydrocarbons, from the stream.

Conduit 1 is next illustrated as having a valve therein with which to produce a regulated pressure drop with which to force part of the main stream through the driving section of a motor-compressor. The entire main stream is next passed through one of the three towers disclosed for contact with the bed of adsorbent material for adsorption of condensable liquids from the stream of natural gas.

A valved manifold directs the gas of the main stream through each of the towers in a predetermined sequence. A similar manifold receives the gas of the main stream from the towers and passes the gas to a heat exchanger before the processed gas is discharged to a point of use.

In these tower manifolds for the main stream of gas, the branch going to tower 3, and coming from tower 3, is shown in the heavier lines. This heavy-line convention is used to indicate that the tower 3 is the one of the three towers processing the natural gas in the system as represented. Tower 3 is suitably legended to additionally emphasize its function at this stage of the process illustrated.

The Process—Bed Heating and Liquid Recovery

It is to be assumed that tower 4 previously processed the main stream, removing therefrom liquefiable hydrocarbons and water. In order to now remove these components from the adsorbent material, it is heated. A convenient means for heating tower 4 is to conduct a heated stream of gas therethrough. The circuit for this heating gas is characterized by conduit 5.

Conduit 5 is illustrated as a closed circuit containing gas which is passed through heater 6 before it is passed through tower 4. A second valved manifold is provided for conducting the heating gas to each of the three towers as desired. Also, a manifold on the discharge of the three towers removes the regeneration gas and directs it through a cooling means. Atmospheric cooler 7 is first illustrated, the regeneration gas being next conducted to heat exchanger 8 to further lower its temperature by heat exchange with the processed stream in conduit 1. Properly designed, the various cooling structures of the system will result in delivery of the regeneration gas to separator 9 at a temperature at which condensation of the desirable hydrocarbons and water will take place.

In separator 9 the recoverable liquid hydrocarbons are removed, separate from the water. This is the end result sought by the process. Of course, there are other advantages which are not to be overlooked. As an example, reduction in dew point of the main stream of natural gas by this process will avoid subsequent formation of liquids in transporting pipe lines which will raise compressor costs. The gaseous portion of the regeneration stream, discharged from separator 9, is returned to heater 6 through motor-compressor 10 and heat exchanger 11. Motor-compressor 10 is disclosed as a mechanical link between the regeneration stream and the main stream through which the energy of the main stream is applied to circulate the gas in the closed circuit. After each tower has been heated, with this regeneration stream, and its liquefiable components vaporized from its bed, the tower and its bed is cooled to raise its adsorptive capacity so that it may be returned to effective process service.

Heat exchanger 11 is a means whereby heat extracted from the tower bed to raise its adsorptive capacity may be conserved. The cooling circuit, provided by the present invention, is associated, through this exchanger 11, with the gas of conduit 5 as the regeneration stream is recycled to the heater. The heat load of heater 6 is thereby reduced.

The Process—Cooling the Bed

It has been conventional to use the regeneration stream to cool the bed heated in regeneration. Under this conventional system, heater 6 would simply be bypassed with three-way valve 15. It may still be advisable to initiate the cooling of the bed in tower 4 by this technique. Until the tower 4 is cooled to a certain level, the relatively cool discharge from separator 9 can be used for this cooling process without appreciable adsorption from this stream, comparatively rich with recoverable components.

Before the bed in tower 4 cools enough to begin significant preloading with liquefiable hydrocarbons from the bypassing conduit 5, the bed is switched into conduit 17. Conduit 17 characterizes the cooling circuit established for the tower beds.

As with conduits 1 and 5, conduit 17 is supplied with valved manifolds for selection of the tower through which its cooling gas stream is directed. A portion of the processed natural gas stream in conduit 1 is split-off, into conduit 17, for the cooling of the tower heated, and perhaps partially cooled, by the recycled regeneration gas in conduit 5. Conduit 17 is illustrated as coming directly from conduit 1, going to the bed in tower 15 and going back to conduit 1.

Between the two points of connection between conduits 17 and conduit 1, a valve 18 is mounted in conduit 1 with which a differential of pressure is established. Regulation of this valve 18 determines the size of the portion of tail gas in conduit 1 which is shunted through conduit 17 to complete the cooling of tower 16. After cooling tower 16, the stream of conduit 17 is heat exchanged with the stream of conduit 17 in exchanger 11 to scavenge its heat and keep the final temperature of the main stream within limits.

SUMMARY OF PROCESS

The over-all operation of the process illustrated in FIGS. 1 and 2 is quite clear if it initially appreciated that three separate circuits are established for each of the beds in the three towers. The first circuit, in conduit 1, brings the main stream of natural gas into contact with the bed of tower 3 for adsorbing liquefiable components from the stream. The second circuit, in conduit 5, initially provides a heated medium for elevating the temperature of the bed until the liquefiable components are vaporized and removed by the heated medium. The second circuit is then bypassed around its heater to start cooling the bed. The third circuit, in conduit 17, provides a relatively lean and cool stream for reducing the temperature of the heated bed until its adsorptive capacity is raised sufficiently high for adsorption service on the main stream.

The Control System—Generally

FIG. 2 illustrates the various segments of the control system for the process of FIG. 1. One segment controls the energy transfer from the main stream to the heating stream in the closed circuit. Another segment controls the valving of the three intake and discharge manifolds and heater bypass valve in order that each bed will process, heat and cool in a desired sequence and for a desired length of time. Another segment monitors the temperature of the cooled bed to prevent the continuation of automatic cycling of the manifold valves which will return the cooled bed to process service until the cooled bed is reduced to the proper temperature for adsorption. Finally, a control segment is provided for a portion of the tail, or processed, gas to be split-off to efficiently transfer the heat picked up from the cooled beds to the heating stream in the closed circuit and keep the temperature of the processed natural gas stream discharged from the system below a predetermined maximum.

The Control System—Regeneration Circuit

The control of the process of FIG. 1 begins with an understanding of the regulation of the power transfer from the main flow stream to the closed, or recycled, regeneration stream. As previously indicated, differential control valve 20 is placed in conduit 1 and a bypass conduit 21 around valve 20 is connected to the motor section of motor-compressor 10. Regulation of valve 20 then establishes the differential in conduit 1 which controls the amount of main stream gas shunted through conduit 21 and, therefore, the speed of motor-compressor 10.

Differential valve 20 is regulated by the flow in the closed circuit. The flow in conduit 5 of the closed circuit is detected by restriction 22 which may be in the form of an orifice plate which creates a differential of pressure across itself. The differential across orifice 22 is applied to a force balance control relay 23. Control relay 23 establishes an output which is applied to a set point controller 24. The output of set point controller 24 is indicated in the form of a fluid pressure which is applied to the diaphragm of valve 20. This general control of differential valve 20 from orifice 22, as a primary element, is disclosed in Fontaine et al. S.N. 740,144, filed June 5, 1958. A more specific disclosure of this control system, incorporating units equivalent to controller 23 and 24, is in Baker 2,957,544.

Orifice 22 is exposed to the variation in the flowing temperature of the recycled regeneration stream in conduit 5. The resulting variation in the differential pressure across orifice 22 results in regulation of valve 20 in the correct direction to vary the flow rate to conduit 21. A decrease of the flowing temperature in conduit 5 causes an increase of flow rate in conduit 21. Increase of the flowing temperature in conduit 5 causes a decrease of flow rate in conduit 21. Thus, there is an automatic regulation of valve 20 in the correct direction to maintain the flow rate required by set point controller 24.

The supply of gas for the regeneration circuit may be from a source whose pressure difference with the main stream is low enough to avoid mechanical disturbance of the beds of the towers as the towers are switched between the circuits.

It is convenient to utilize the main stream of gas to be processed as the source. A communicating pipe 26 is shown between conduit 1 downstream of valve 20 and conduit 5 downstream of motor-compressor 10. It may be desirable to establish a maximum flow rate through pipe 26. A valve 27 in pipe 26 represents a means of establishing this control. Obviously, the pipe 26 could be connected between other points in conduits 1 and 5 to equalize the pressure between the two circuits.

*The Control System—Manifold Valves and Heater Bypass*

Manifolds for conduits 1, 5 and 17 have been provided so that each conduit may be connected to each of the three towers 3, 4 and 16. Basically, the three conduits are connected to the three towers, through these manifolds, on a time-cycle basis. A time-cycle controller 25 has been illustrated as connected separately to each of the three intake manifold valves and to each of the three discharge manifold valves of the conduits and the heating-cooling valve 15. A time-cycle mechanism suitable for this purpose is also illustrated in Baker 2,957,544. Through this time-cycle controller the intake manifold of each conduit is valved at the same time the output manifold for the same conduit is valved.

Time-cycle controller 25 could be either an electric or the mechanical-pneumatic type illustrated in Baker 2,957,544. If the mechanical-pneumatic type, its cams can be readily shaped so as to actuate valve 15 before the three manifolds are valved to switch the towers. In this manner the cooling of the bed of tower 4 is started with the closed regeneration circuit of conduit 5 bypassing heater 6. The cooling is then completed with the gas of conduit 17. Each of the three manifolds are valved simultaneously, by controller 25, to effectively pass the towers from the left to the right in the system as illustrated in FIGS. 1 and 2.

*The Control System—Cooling Tower Temperature Monitor*

The cooling of the bed in tower 16 must be carefully monitored to prevent the tower from being placed back into adsorption service before its adsorptive capacity is raised to an effective level. The cooling function is guarded by placing temperature responsive element 30 in the output manifold of conduit 17.

A simple, filled system is connected to conduit 17, including expansible bellows 31. A three-way, snap-acting fluid pressure valve 32 is actuated by bellows 31 to develop a fluid pressure output. This output is applied to controller 25 to block its output actuating impulses to the manifold valves until the temperature of the bed in tower 16 is low enough to insure the adsorptive capacity of the bed is high enough to give proper processing service to the main stream.

*The Control System—Cooling Circuit*

Time-cycle controller 25 may be readily arranged to initiate the cooling of a bed, in the position of tower 4, a finite period of time before effectively placing the bed in the position of tower 16. Bypass valve 15 is positioned so the gas in conduit 5 does not pass through either exchanger 11 or heater 6, but is diverted around these units. In this way, the gas from the separator 9 is used to start cooling the bed in tower 4 until the bed reaches a temperature near which it will begin to pre-load with recoverable hydrocarbons and water from the separator gas. Gas of cooling circuit 17 is then substituted for the separator gas.

The present invention has particular concern with the control of gas of cooling circuit 17. It is, of course, desirable to prevent this heated gas from elevating the temperature of the main gas stream beyond a predetermined value. Downstream equipment and conduits receiving the gas would be endangered by the high temperature. However, the function of the heat exchanger 11, as it transfers heat from circuit 17 into conduit 5, is also to be considered. Also, the rate at which bed 16 is cooled should be considered so the transfer of all the beds from circuit to circuit will be properly coordinated.

Valve 18 could be controlled by a fluid pressure signal from time-cycle controller 25. A cam could start in rotation within controller 25 at the time the bed in the position of tower 4 is effectively placed in the position of tower 16. The cam could be cut in accordance with the cooling characteristics of tower 16, heat exchanger 11 and the capacity of their connecting circuits. The resulting manipulation of valve 18, by this programmed signal, will give a rate of flow in conduit 17 which will complete the cooling of the bed in tower 16 by the time tower 4 is ready to go on cooling and tower 3 is ready to come off adsorption. Also, the flow of gas through heat exchanger 11 will be in accordance with the design of the exchanger to give the maximum heat transfer possible under the conditions of operation.

FIGS. 1 and 2 illustrate, specifically, the flow in conduit 17 being regulated from two elements. The final temperature of the main stream in conduit 1 is detected by temperature responsive element 35 and the flow in conduit 17 is detected by the pressure drop across orifice 35A. A flow controller 35B responds to the differential pressure output of orifice 35A, and temperature controller 35C responds to the temperature element 35. The output of 35B and 35C are taken to a station at 35D to develop the final control impulse for regulation of valve 18 to modulate the flow of conduit 17 in carrying out the objects of the invention.

FIG. 2 illustrates the mechanism of temperature controller 35C and 35B in some detail. Temperature responsive element 35 is readily made a part of a filled system including bellows 36. Bellows 36 is arranged to oppose spring 37 in a position-balance system whose fluid pressure output is applied to controller 35D.

Orifice 35A may have its pressures applied to separate bellows 36A and 36B. The resulting force may be opposed by spring 37A in a position-balance system whose fluid pressure output is applied to controller 35D. Both these systems could be force-balance/set point controller combinations similar to 23. In either event, the selector station 35D determines the range of effectiveness for the flow as an element of control and overrides this element with the temperature at predetermined values of temperature.

TWO-BED SYSTEM

*The Process—Adsorption*

In many respects, the system of FIGS. 3 and 4 operates exactly as does the three-bed system of FIGS. 1 and 2. However, there are differences which may make it confusing to use the same numbers to identify similar conduits and apparatus. Therefore, another series of numbers is employed in FIGS. 3 and 4.

The stream of natural gas to be processed is in conduit 101. Inlet separator 102 receives the stream and scrubs free liquids from it.

Valved manifolds direct the gas of conduit 101 through each of the two towers in turn. As in FIGS. 1 and 2, a heavy-line drawing is used to show the flow as the system is operating at one period. As illustrated, at this time, the main stream is being processed by tower 103.

The Process—Bed Heating and Liquid Recovery

Tower 104 is assumed to have previously processed the main stream. Having adsorbed liquefiable hydrocarbons and water from the main stream, tower 104 is next heated by a stream of gas in conduit 105.

Conduit 105 is a closed circuit, heated by heater 106. Manifolds are supplied by conduit 105 so each tower may be heated in turn by proper, alternate, manipulation of the manifold valves.

The gas from the heated tower, in conduit 105, is cooled by atmospheric cooler 107 and heat exchanger 108 until condensation takes place. The condensed liquids are removed in separator 109 as the basic recovery function of the system. The gas not condensed in separator 109 is then returned to heater 106 through motor-compressor 110.

The Process—Cooling the Bed

It has been conventional to simply bypass heater 106 with the regeneration stream of gas to cool the heated bed. Three-way valve 115 is employed to direct the regeneration gas so as to cool the bed in this manner. However, it is not advisable to cool the bed below a certain temperature or pre-loading will occur. Therefore, the processed, leaner main stream can be used as it was used in the three-tower system.

A completely separate cooling circuit for the main stream gas is not necessary in the system of FIGS. 3 and 4. With a system using but two towers, the heating function and cooling function of the gas in the conduit 105 must be suspended for a portion of each cycle. The lean, relatively cool, tail gas is then spliced into the conduit 105 manifolds on each side of the tower being cooled in regeneration.

The cooling circuit then becomes embodied in conduits 117 and 117A. These conduits are connected into conduit 101 on each side of valve 118. Three-way valves 119 and 119A specifically connect these conduits downstream of heater 106 and downstream of heat exchanger 107. When the valves are positioned as intended, the outputs of motor-compressor 110 and separator 109 are dead-ended at the valves and the tail gas is sent through tower 104.

The Control System—Generally

FIG. 4 illustrates the various control elements of the process of FIG. 3. The energy transfer from the main stream to the closed, recycled regeneration stream is controlled exactly as in FIG. 2. The regeneration is dead-ended at valves 119 and 119A during each cycle in order that the cooling by the tail gas can complete the bed cooling. At such time, the motor-compressor is completely bypassed by the main stream and thereby stopped completely.

The normal, alternate positioning of the manifold valves of conduits 101 and 105 is carried out on a time-cycle basis. The conduit 105 will be bypassed around heater 106 to start the cooling of the bed and then the tail gas is caused to take over and complete this function. As in the system of FIG. 2, the temperature of the cooled bed is monitored. The cycle will not continue until the regenerated bed is cool enough to do an effective job of processing the main stream.

Finally, the tail-gas available for cooling is controlled in any of the ways described in connection with the disclosure of FIGS. 1 and 2.

The Control System—Regeneration Circuit

The control of power transfer from the flowing stream of conduit 101 is specifically accomplished by regulation of valve 120. Valve 120 is placed in bypass conduit 121 which includes the driven section of motor-compressor 110.

Valve 120 is controlled by the differential across orifice 122. More specifically, force balance control relay 123 establishes an output which is applied to set point controller 124. It is the output of set point controller 124 which is normally applied to position valve 120.

When valves 119 and 119A are positioned to pass the processed gas through the cooling tower 104, the output of controller 124 is blocked from valve 120. More specifically, the control pipe from controller 124 to valve 120 is vented to atmosphere through three-way valve 125A to allow valve 120 to open and no longer force a part of the stream in conduit 101 through 121. As indicated in FIG. 4, it is anticipated that the impulse to valves 119 and 119A will be simultaneously applied to gas valve 125A.

Regeneration gas for conduit 105 is supplied from conduit 101. Communicating pipe 126 is shown between conduit 101 and conduit 105 with a valve 127 to control the shift in gas inventory between the two conduits as bypass heater valve 115 is opened and closed.

The Control System—Manifold Valves and Heater Bypass

The manifold valves for conduits 101 and 105 are alternately operated by time-cycle controller 125. Each set of valves is separately actuated. Heating-cooling valve 115 is also separately actuated, so that heater 106 can be bypassed a predetermined period of time during each half-cycle of operation to initiate the cooling of tower 104 before the tail gas is applied into the regeneration circuit and thereby substituted for the bypassing regeneration gas.

The Control System—Cooling Tower Temperature Monitor

The temperature of the cooling tower is sensed by temperature responsive element 130. Element 130 is part of a filled system including bellows 131. As in the system of FIGS. 1 and 2, bellows 131 is opposed by a spring which mechanically actuates three-way valve 132. Valve 132 develops an impulse which is applied to time-cycle controller 125 to block its outputs to the manifold valves until the temperature at 130 is low enough to indicate the adsorptive capacity of the bed in tower 104 is high enough to again process the main stream.

The Control System—Cooling Circuit

Time-cycle controller 125 has been disclosed as actuating valve 115 a predetermined time before effectively placing the bed of tower 104 in the position of tower 103. Heater 106 is bypassed and the relatively cool gas from separator 109 initiates the cooling of the bed in tower 104. This period of cooling is allowed to continue until the bed is almost cool enough to pre-load with recoverable liquids from the separator gas. The cooling circuit of conduits 117 and 117A is then spliced into the conduit 105 through tower 104 by actuation of valves 119 and 119A with controller 125.

It is desirable to control valve 118 to split off a desired amount of tail gas from conduit 101 into conduits 117 and 117A. Without concomitant regeneration gas flow in conduit 105 and conduits 117 and 117A, heat exchange is not carried out to save the load on heater 106. Control of valve 118 is not carried out with this operation in view. However, it is a problem to control valve 118 so the cooling of the bed in tower 104 will be carried out efficiently. Flow control may be a desirable index of this control system for valve 118 for at least this reason. Therefore, an orifice 135A is shown in conduit 117A and flow controller 135B, temperature controller 135C and controller station 135D indicated as having functions similar to 35A, 35B, 35C, and 35D of FIG. 1. In FIG. 4, 136A and 136B functions as bellows 36A and 36B. Spring 137A functions as spring 37A. The result is proper regulation of the valve 118 to modulate the flow of the tail gas portion cooling the bed of tower 104 in a predetermined manner, the temperature sensed by element 135 providing the final override to maintain the downstream product of the system below a predetermined maximum temperature.

CONCLUSION

In one aspect, the invention serves to reduce the temperature of a regenerated bed of adsorbent material with the supply of gas of the process most readily available and offering the smallest opportunity for pre-loading the bed with the very materials it is to remove from the processed gas. The processed gas itself is the choice.

The problem of conducting the tail gas to the bed to be cooled differs to some extent between two and three tower systems. These differences have been carefully pointed out.

The more specific problem of controlling the conducting of the tail-gas has been disclosed. The basic time-cycle control of the bed switching, modified, monitored and supplemented by final bed temperature and final temperature of the processed gas has been carefully set forth. The automatic continuous operation of a hydrocarbon recovery unit is obviously possible in accordance with this disclosure.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. The method of recovering condensable hydrocarbons from a main flow stream of natural gas which includes;

contacting a bed of adsorbent material with the main flow stream of natural gas, whereby condensable hydrocarbons are adsorbed by the bed material;

heating a reactivation flow stream of natural gas, whereby the vaporizing capacity of the reactivating flow stream is raised;

contacting the bed of adsorbent material with the heated reactivation flow stream;

cooling the reactivation flow stream to its dew point, whereby condensable hydrocarbons are recovered;

diverting at least a portion of the main flow stream after the stream has hydrocarbons adsorbed from it;

cooling the bed with the diverted portion of the main flow stream, whereby the bed is prepared to be again contacted with the main flow stream of natural gas to remove hydrocarbons from the main flow stream by adsorption;

returning the diverted portion of the main flow stream to the undiverted remainder of the main flow stream;

establishing a control signal varying in accordance with a predetermined program for the flow of the diverted portion of the main flow stream which will reduce the temperature of the cooled bed at a predetermined rate to that temperature which will prepare the bed to be again contacted with the main flow stream of natural gas;

and utilizing the established control signal to regulate the size of the diverted portion of the main flow stream cooling the bed.

2. A system for recovering condensable hydrocarbons from a main flow stream of natural gas which includes;

a bed of adsorbent material;

a first circuit for the main flow stream of natural gas including the bed of adsorbent material, whereby the natural gas passing through the bed has its condensable hydrocarbons retained by the bed;

a second circuit for a reactivation flow stream of gas;

a heater for the reactivation flow stream;

means for including the bed of adsorbent material in the second circuit after the bed has removed condensable hydrocarbons from the main flow stream;

means for cooling the reactivation flow stream after it has flowed in the second circuit from the bed until the dew point of the stream is reached and recovery of the condensable hydrocarbons is made;

a third circuit for diverting at least a portion of the main flow stream after the stream has hydrocarbons adsorbed from it;

means for including the bed of adsorbent material in the third circuit to cool the bed, whereby the bed is prepared to be again contacted with the main flow stream of the first circuit to remove hydrocarbons from the stream by adsorption;

means for returning the diverted portion of the main flow stream of the third circuit to the main flow stream of the first circuit;

a time-cycle controller establishing a control signal which varies in accordance with a predetermined program for the flow of the diverted portion of the main flow stream in the third circuit which will reduce the temperature of the cooled bed at a predetermined rate to that temperature which will prepare the bed to be again contacted with the main flow stream in the first circuit within a predetermined period of time;

and control means regulated by the control signal of the time-cycle controller to regulate the size of the portion of the main flow stream diverted into the third circuit.

3. The method of recovering condensable hydrocarbons from a main flow stream of natural gas which includes;

contacting a bed of adsorbent material with the main flow stream of natural gas, whereby condensable hydrocarbons are adsorbed by the bed material;

heating a reactivation flow stream of natural gas, whereby the vaporizing capacity of the reactivating flow stream is raised;

contacting the bed of adsorbent material with the heated reactivation flow stream;

cooling the reactivation flow stream to its dew point, whereby condensable hydrocarbons are recovered;

diverting at least a portion of the main flow stream after the stream has hydrocarbons adsorbed from it;

cooling the bed with the diverted portion of the main flow stream, whereby the bed is prepared to be again contacted with the main flow stream of natural gas to remove hydrocarbons from the main flow stream by adsorption;

transferring heat from the diverted portion of the main flow stream to the reactivation flow stream to raise the vaporizing capacity of the reactivation flow stream and conserve the heat input to the system;

returning the diverted portion of the main flow stream to the undiverted remainder of the main flow stream;

establishing a control signal varying in accordance with a predetermined flow of the diverted portion of the main flow stream which will result in a predetermined rate of transfer of heat from the diverted portion of the main flow stream to the reactivation flow stream;

and utilizing the established control signal to regulate the size of the diverted portion of the main flow stream.

4. A system for recovering condensable hydrocarbons from a main flow stream of natural gas which includes;

a bed of adsorbent material;

a first circuit for the main flow stream of natural gas including the bed of adsorbent material, whereby the natural gas passing through the bed has its condensable hydrocarbons retained by the bed;

a second circuit for a reactivation flow stream of gas;

a heater for the reactivation flow stream;

means for including the bed of adsorbent material in the second circuit after the bed has removed condensable hydrocarbons from the main flow stream;

means for cooling the reactivation flow stream after it has flowed in the second circuit from the bed until the dew point of the stream is reached and recovery of the condensable hydrocarbons is made;

a third circuit for diverting at least a portion of the main flow stream after the stream has hydrocarbons adsorbed from it;

means for including the bed of adsorbed material in the third circuit to cool the bed, whereby the bed is prepared to be again contacted with the main flow stream of the first circuit to remove hydrocarbons from the stream by adsorption;

a heat exchanger in which the reactivation flow stream of gas in the second circuit after the reactivation flow stream has been cooled to its dew point is heat exchanged with the portion of the main flow stream in the third circuit after the portion of the main flow stream has cooled the bed of adsorbent material, whereby heat removed from the cooled bed of adsorbent is transferred to the reactivation flow stream initiating its temperature rise to increase the vaporizing capacity of the reactivation flow stream and conserving the heat input to the system, means for returning the diverted portion of the main flow stream of the third circuit to the main flow stream of the first circuit;

flow responsive means positioned in the third circuit in order to respond to the flow of the diverted portion of the main flow stream;

and control means regulated by the flow responsive means to adjust the rate of the flow in the third circuit which will transfer heat to the reactivation flow stream at a predetermined rate.

5. The method of recovering condensable hydrocarbons from a main flow stream of natural gas which includes;

contacting a bed of adsorbent material with the main flow stream of natural gas, whereby condensable hydrocarbons are adsorbed by the bed material;

heating a reactivation flow stream of natural gas, whereby the vaporizing capacity of the reactivating flow stream is raised;

contacting the bed of adsorbent material with the heated reactivation flow stream;

cooling the reactivation flow stream to its dew point, whereby condensable hydrocarbons are recovered;

interrupting the heating of the reactivation flow stream after the bed has had its adsorbed condensable hydrocarbons vaporized by the reactivation flow stream, whereby the cooling of the bed is initiated in preparing the bed to be again contacted wtih the main flow stream of natural gas to remove condensable hydrocarbons therefrom, diverting at least a portion of the main flow stream after the stream has hydrocarbons adsorbed from it;

cooling the bed with the diverted portion of the main flow stream, whereby the bed is prepared to be again contacted with the main flow stream of natural gas to remove hydrocarbons from the main flow stream by adsorption;

returning the diverted portion of the main flow stream to the undiverted remainder of the main flow stream;

establishing a control signal varying in accordance with a predetermined program for the flow of the diverted portion of the main flow stream which will reduce the temperature of the cooled bed at a predetermined rate to the level at which the bed will be prepared to be again contacted with the main flow stream of natural gas;

and utilizing the established control signal to regulate the size of the diverted portion of the main flow stream cooling the bed.

6. A system for recovering condensable hydrocarbons from a main flow stream of natural gas which includes;

a bed of adsorbent material;

a first circuit for the main flow stream of natural gas including the bed of adsorbent material, whereby the natural gas passing through the bed has its condensable hydrocarbons retained by the bed;

a second circuit for a reactivation flow stream of gas;

a heater for the reactivation flow stream;

means for including the bed of adsorbent material in the second circuit after the bed has removed condensable hydrocarbons from the main flow stream;

means for cooling the reactivation flow stream after it has flowed in the second circuit from the bed until the dew point of the stream is reached and recovery of the condensable hydrocarbons is made;

means with which to interrupt the heat input from the heater to the reactivation flow stream after condensable hydrocarbons have been vaporized from the bed, whereby the reactivation flow stream then becomes a cooling medium for the bed for a finite period of time in preparing the bed to be again contacted by the main flow stream of natural gas to remove condensable hydrocarbons therefrom, a third circuit for diverting at least a portion of the main flow stream after the stream has hydrocarbons adsorbed from it;

means for including the bed of adsorbent material in the third circuit to cool the bed, whereby the bed is prepared to be again contacted with the main flow stream of the first circuit to remove hydrocarbons from the stream by adsorption;

means for returning the diverted portion of the main flow stream of the third circuit to the main flow stream of the first circuit;

flow responsive means positioned in the third circuit in order to respond to the flow of the diverted portion of the main flow stream;

temperature responsive means positioned in the main flow stream of the first circuit downstream of the point at which the diverted portion is returned to the undiverted remainder of the main flow stream in order to respond to the temperature of the mixture of the streams;

and control means regulated by the flow responsive means and temperature responsive means to adjust the amount of the main flow stream of gas diverted into the third circuit to reduce the temperature of the cooled bed at a predetermined rate.

7. The method of recovering condensable hydrocarbons from a main flow stream of natural gas which includes;

contacting a bed of adsorbent material with the main flow stream of natural gas, whereby condensable hydrocarbons are adsorbed by the bed material;

heating a reactivation flow stream of natural gas, whereby the vaporizing capacity of the reactivating flow stream is raised;

contacting the bed of adsorbent material with the heated reactivation flow stream;

cooling the reactivation flow stream to its dew point, whereby condensable hydrocarbons are recovered;

diverting at least a portion of the main flow stream after the stream has hydrocarbons adsorbed from it;

cooling the bed with the diverted portion of the main flow stream, whereby the bed is prepared to be again contacted with the main flow stream of natural gas to remove hydrocarbons from the main flow stream by adsorption;

switching the bed between contact by the main flow stream and contact by the regeneration flow stream and contact by the diverted portion of the main flow stream on a predetermined time-cycle program;

sensing the temperature of the diverted portion of the main flow stream after the diverted portion has contacted the bed;

utilizing the sensed temperature of the diverted portion of the main flow stream to adjust the time-cycle program to maintain the sensed temperature of the portion flowing out of the cooled bed within a predetermined range;

returning the diverted portion of the main flow stream to the undiverted remainder of the main flow stream;

establishing a control signal varying in accordance with a predetermined program for the flow of the diverted portion of the main flow stream which will reduce the temperature of the cooled bed at a predetermined rate to that temperature which will prepare the bed to be again contacted with the main flow stream of natural gas;

and utilizing the established control signal to regulate the size of the diverted portion of the main flow stream cooling the bed.

8. A system for recovering condensable hydrocarbons from a main flow stream of natural gas which includes;

a bed of adsorbent material;

a first circuit for the main flow stream of natural gas including the bed of adsorbent material, whereby the natural gas passing through the bed has its condensable hydrocarbons retained by the bed;

a second circuit for a reactivation flow stream of gas;

a heater for the reactivation flow stream;

means for including the bed of adsorbent material in the second circuit after the bed has removed condensable hydrocarbons from the main flow stream;

means for cooling the reactivation flow stream after it has flowed in the second circuit from the bed until the dew point of the stream is reached and recovery of the condensable hydrocarbons is made;

a third circuit for diverting at least a portion of the main flow stream after the stream has hydrocarbons adsorbed from it;

means for including the bed of adsorbent material in the third circuit to cool the bed, whereby the bed is prepared to be again contacted with the main flow stream of the first circuit to remove hydrocarbons from the stream by adsorption;

a first time-cycle controller operating valves between the bed and the three circuits to sequentially include the bed in the circuits;

a temperature responsive means sensing the temperature of the diverted portion of the main flow stream in the third circuit after the diverted portion of the main flow stream has cooled the bed;

means for monitoring the time-cycle controller with the temperature responsive means to initiate the operation of the time-cycle controller in starting the time-cycle program of including the bed in the three circuits when the temperature of the portion flowing out of the cooled bed reaches a predetermined range;

means for returning the diverted portion of the main flow stream of the third circuit to the main flow stream of the first circuit;

a second time-cycle controller establishing a control signal which varies in accordance with a predetermined program for the flow of the diverted portion of the main flow stream in the third circuit which will reduce the temperature of the cooled bed at a predetermined rate to that temperature which will prepare the bed to be again contacted with the main flow stream in the first circuit;

and control means regulated by the control signal of the second time-cycle controller to regulate the size of the portion of the main flow stream diverted into the third circuit.

9. The method of recovering condensable hydrocarbons from a main flow stream of natural gas which includes;

contacting a first bed of adsorbed material with the main flow stream of natural gas, whereby condensable hydrocarbons are adsorbed by the bed material;

heating a recycled reactivation flow stream of natural gas, whereby the vaporizing capacity of the reactivating flow stream is raised;

contacting the first bed of adsorbent material with the heated reactivation flow stream while diverting the main flow stream to a second bed of adsorbent material;

cooling the reactivation flow stream to its dew point, whereby condensable hydrocarbons vaporized from the beds are removed and recovered;

diverting at least a portion of the main flow stream after the stream has hydrocarbons adsorbed from it by the second bed of adsorbent material;

terminating the flow of the heated reactivation stream through the first bed of adsorbent material;

cooling the first bed of adsorbent material with the diverted portion of the main flow stream, whereby the bed is prepared to be again contacted with the main flow stream of natural gas to remove hydrocarbons from the main flow stream by adsorption;

returning the diverted portion of the main flow stream to the undiverted remainder of the main flow stream;

establishing a control signal varying in accordance with a predetermined program for the flow of the diverted portion of the main flow stream which will reduce the temperature of the first bed at a predetermined rate to that temperature which will prepare the first bed to be again contacted with the main flow stream of natural gas by the time the second bed is ready to be heated and cooled to regenerate it;

utilizing the established control signal to regulate the size of the diverted portion of the main flow stream cooling the first bed;

and returning the first bed to processing the main flow stream while the second bed is heated and cooled to regenerate it.

10. A system for recovering condensable hydrocarbons from a main flow stream of natural gas which includes;

a first bed of adsorbent material;

a first circuit for the main flow stream of natural gas connected to the first bed of adsorbent material, whereby the natural gas passing through the bed has its condensable hydrocarbons retained by the bed;

a second circuit for a reactivation flow stream of gas;

a heater for the reactivation flow stream;

a second bed of adsorbent material;

means for disconnecting the first circuit from the first bed and connecting the second circuit to the first bed while the first circuit is connected to the second bed, whereby the heated reactivation flow stream vaporizes the condensable hydrocarbons from the first bed while the main flow stream is processed by the second bed;

means for cooling the reactivation flow stream in the second circuit after the heated stream has flowed through the first bed down to the dew point of the stream, whereby condensable hydrocarbons vaporized from the beds are removed and recovered;

a third circuit connected to the first circuit across a modulating valve in the first circuit which valve is located in the first circuit downstream of the connection of the first circuit with the beds;

means for disconnecting the second circuit from the first bed and connecting the third circuit with the first bed, whereby the first bed is cooled and thereby prepared for connection to the first circuit to remove hydrocarbons from the main flow stream by adsorption;

a time-cycle controller establishing a control signal which varies in accordance with a predetermined program for the flow in the third circuit which will reduce the temperature of the first bed at a predetermined rate to that temperature which will prepare the first bed to be again contacted with the main flow stream in the first circuit by the time the second bed is ready to be connected to the second circuit;

means for applying the control signal of the time-cycle controller to the modulating valve to regulate the size of the portion of the main flow stream diverted into the third circuit;

and means for disconnecting the third circuit from the first bed and reconnecting the first circuit to the first bed while the second bed is disconnected from the first bed and connected to the second and third circuits.

11. The method of recovering condensable hydrocarbons from a main flow stream of natural gas which includes;

contacting a first bed of adsorbed material with the main flow stream of natural gas, whereby condensable hydrocarbons are adsorbed by the bed material;

heating a reactivation flow stream of natural gas, whereby the vaporizing capacity of the reactivating flow stream is raised;

contacting the first bed of adsorbent material with the heated reactivation flow stream while diverting the main flow stream to a second bed of adsorbent material;

cooling the reactivation flow stream to its dew point, whereby condensable hydrocarbons vaporized from the beds are removed and recovered;

diverting at least a portion of the main flow stream after the stream has hydrocarbons adsorbed from it by the second bed of adsorbent material;

terminating the flow of the heated reactivation stream through the first bed of adsorbent material;

cooling the first bed of adsorbent material with the diverted portion of the main flow stream, whereby the bed is prepared to be again contacted with the main flow stream of natural gas to remove hydrocarbons from the main flow stream by adsorption;

transferring heat from the diverted portion of the main flow stream to the reactivation flow stream in addition to the heating to raise the vaporizing capacity of the reactivating flow stream;

returning the diverted portion of the main flow stream to the undiverted remainder of the main flow stream;

establishing a control signal varying in accordance with a predetermined rate of flow for the diverted portion of the main flow stream which will develop a predetermined rate for the transfer of heat from the diverted portion of the main flow stream to the reactivation flow stream;

and utilizing the established control signal to regulate the size of the diverted portion of the main flow stream;

and returning the first bed to processing the main flow stream while the second bed is heated and cooled to regenerate it.

12. A system for recovering condensable hydrocarbons from a main flow stream of natural gas which includes;

a first bed of adsorbent material;

a first circuit for the main flow stream of natural gas connected to the first bed of adsorbent material, whereby the natural gas passing through the bed has its condensable hydrocarbons retained by the bed;

a second circuit for a reactivation flow stream of gas;

a heater for the reactivation flow stream;

a second bed of adsorbent material;

means for disconnecting the first circuit from the first bed and connecting the second circuit to the first bed while the first circuit is connected to the second bed, whereby the heated reactivation flow stream vaporizes the condensable hydrocarbons from the first bed while the main flow stream is processed by the second bed;

means for cooling the reactivation flow stream in the second circuit after the heated stream has flowed through the first bed down to the dew point of the stream, whereby condensable hydrocarbons vaporized from the beds are removed and recovered;

a third circuit connected to the first circuit across a modulating valve in the first circuit which valve is located in the first circuit downstream of the connection of the first circuit with the beds;

means for disconnecting the second circuit from the first bed and connecting the third circuit with the first bed, whereby the first bed is cooled and thereby prepared for connection to the first circuit to remove hydrocarbons from the main flow stream by adsorption;

a heat exchanger connected to the third circuit downstream of the connection of the third circuit with the beds and to the second circuit upstream of the heater for the reactivation flow stream;

flow responsive means positioned in the third circuit to respond to the flow of the diverted portion of the main flow stream;

control means regulated by the flow responsive means to adjust the rate of the flow in the third circuit which will cause the heat exchanger to transfer heat to the reactivation flow stream at a predetermined rate;

and means for disconnecting the third circuit from the first bed and reconnecting the first circuit to the first bed while the second bed is disconnected from the first circuit and connected to the second and third circuits.

13. The method of recovering condensable hydrocarbons from a main flow stream of natural gas which includes;

contacting a first bed of adsorbed material with the main flow stream of natural gas, whereby condensable hydrocarbons are adsorbed by the bed material;

heating a reactivation flow stream of natural gas, whereby the vaporizing capacity of the reactivating flow stream is raised;

contacting the first bed of adsorbent material with the heated reactivation flow stream while diverting the main flow stream to a second bed of adsorbent material;

cooling the reactivation flow stream to its dew point, whereby condensable hydrocarbons vaporized from the beds are removed and recovered;

interrupting the heating of the recycled reactivation flow stream after the first bed has had its adsorbed condensable hydrocarbons vaporized by the reactivation flow stream, whereby the cooling of the first bed is initiated in preparing the first bed to be again contacted with the main flow stream of natural gas to remove condensable hydrocarbons therefrom;

diverting at least a portion of the main flow stream after the stream has hydrocarbons adsorbed from it by the second bed of adsorbent material;

terminating the flow of the heated reactivation stream through the first bed of adsorbent material;

continuing the cooling of the first bed of adsorbent material with the diverted portion of the main flow stream, whereby the bed is prepared to be again contacted with the main flow stream of natural gas to remove hydrocarbons from the main flow stream by adsorption;

returning the diverted portion of the main flow stream to the undiverted remainder of the main flow stream;

establishing a control signal varying in accordance with a predetermined program for the flow of the diverted portion of the main flow stream which will cool the first bed of adsorbent material at a predetermined rate down to the level at which the first bed will be prepared to be again contacted with the main flow stream of natural gas by the time the second bed is ready for the heating and cooling of regeneration;

utilizing the established control signal to regulate the size of the diverted portion of the main flow stream cooling the first bed; and returning the first bed to processing the main flow stream while the second bed is heated and cooled to regenerate it.

14. A system for recovering condensable hydrocarbons from a main flow stream of natural gas which includes;
a first bed of adsorbent material;
a first circuit for the main flow stream of natural gas connected to the first bed of adsorbent material, whereby the natural gas passing through the bed has its condensable hydrocarbons retained by the bed;
a second circuit for a reactivation flow stream of gas;
a heater for the reactivation flow stream;
a second bed of adsorbent material;
means for disconnecting the first circuit from the first bed and connecting the second circuit to the first bed while the first circuit is connected to the second bed, whereby the heated reactivation flow stream vaporizes the condensable hydrocarbons from the first bed while the main flow stream is processed by the second bed;
means for cooling the reactivation flow stream in the second circuit after the heated stream has flowed through the first bed down to the dew point of the stream, whereby condensable hydrocarbons vaporized from the beds are removed and recovered;
means with which to interrupt the heat input from the heater to the reactivation flow stream after condensable hydrocarbons have been vaporized from the bed, whereby the reactivation flow stream then becomes a cooling medium for the first bed for a finite period of time in preparing the first bed to be again contacted by the main flow stream of natural gas to remove condensable hydrocarbons therefrom;
a third circuit connected to the first circuit across a modulating valve in the first circuit which valve is located in the first circuit downstream of the connection of the first circuit with the beds;
means for disconnecting the second circuit from the first bed and connecting the third circuit with the first bed, whereby the first bed has its cooling completed for connection to the first circuit to remove hydrocarbons from the main flow stream by adsorption;
flow responsive means positioned in the third circuit in order to respond to the flow of the diverted portion of the main flow stream;
temperature responsive means in the first circuit downstream of the connection across the modulating valve in the first circuit;
control means regulated by the flow responsive means and temperature responsive means to adjust the amount of the main flow stream of gas diverted into the third circuit to reduce the temperature of the cooled bed at a predetermined rate;
and means for disconnecting the third circuit from the first bed and reconnecting the first circuit to the first bed while the second bed is disconnected from the first circuit and connected to the second and third circuits.

15. The method of recovering condensable hydrocarbons from a main flow stream of natural gas which includes;
contacting a first bed and a second bed of adsorbent material with the main flow stream of natural gas on a predetermined time-cycle basis, whereby condensable hydrocarbons are adsorbed by the material of the beds;
heating a recycled reactivation flow stream of natural gas, whereby the vaporizing capacity of the reactivating flow stream is raised;
contacting the first bed of adsorbent material with the heated reactivation flow stream while diverting the main flow stream to a second bed of adsorbent material on a predetermined time-cycle basis;
cooling the reactivation flow stream to its dew point, whereby condensable hydrocarbons vaporized from the beds are removed and recovered;
diverting at least a portion of the main flow stream after the stream has hydrocarbons adsorbed from it by the second bed of adsorbent material;
terminating the flow of the reactivation flow stream through the first bed of adsorbent material on a predetermined time-cycle basis;
cooling the first bed of adsorbent material with the diverted portion of the main flow stream, whereby the bed is prepared to be again contacted with the main flow stream of natural gas to remove hydrocarbons from the main flow stream by adsorption;
returning the diverted portion of the main flow stream to the undiverted remainder of the main flow stream;
sensing the temperature of the diverted portion of the main flow stream after the diverted portion has contacted the first bed;
utilizing the sensed temperature of the diverted portion of the main flow stream to adjust the time-cycle programs to maintain the sensed temperature of the portion flowing out of the cooled bed within a predetermined range;
establishing a control signal varying in accordance with a predetermined program for the flow of the diverted portion of the main flow stream which will reduce the temperature of the cooled first bed at a predetermined rate to that temperature which will prepare the first bed to be again contacted with the main flow stream of natural gas;
utilizing the established control signal to regulate the size of the diverted portion of the main flow stream cooling the first bed;
and returning the first bed to processing the main flow stream while the second bed is heated and cooled to regenerate it.

16. A system for recovering condensable hydrocarbons from a main flow stream of natural gas which includes;
a first bed of adsorbent material;
a first circuit for the main flow stream of natural gas connected to the first bed of adsorbent material, whereby the natural gas passing through the bed has its condensable hydrocarbons retained by the bed;
a second circuit for a reactivation flow stream of gas;
a heater for the reactivation flow stream;
a second bed of adsorbent material;
a first set of valves for disconnecting the first circuit from the first bed and connecting the second circuit to the first bed while the first circuit is connected to the second bed, whereby the heated reactivation flow stream vaporizes the condensable hydrocarbons from the first bed while the main flow stream is processed by the second bed;

means for cooling the reactivation flow stream in the second circuit after the heated stream has flowed through the first bed down to the dew point of the stream, whereby condensable hydrocarbons vaporized from the beds are removed and recovered;

a third circuit connected to the first circuit across a modulating valve in the first circuit which valve is located in the first circuit downstream of the connection of the first circuit with the beds;

a second set of valves for disconnecting the second circuit from the first bed and connecting the third circuit with the first bed, whereby the first bed is cooled and thereby prepared for connection to the first circuit to remove hydrocarbons from the main flow stream by adsorption;

a third set of valves for disconnecting the third circuit from the first bed and reconnecting the first circuit to the first bed while the second bed is disconnected from the first circuit and connected to the second and third circuits;

a first temperature responsive means sensing the temperature of the diverted portion of the main flow stream after the diverted portion has contacted the first bed;

a first time-cycle controller operating the first and second and third sets of valves between the beds and the three circuits to sequentially connect and disconnect the beds to the three circuits while monitored by the first temperature responsive means to initiate the operation of the time-cycle controller in operating the valves to connect the first circuit with the bed cooled by the third circuit gas when the temperature of the gas portion flowing out of the cooled bed reaches a predetermined range;

a second time-cycle controller establishing a control signal which varies in accordance with a predetermined program for the flow of the diverted portion of the main flow stream in the third circuit which will reduce the temperature of the cooled first bed at a predetermined rate to that temperature which will prepare the first bed to be again contacted with the main flow stream in the first circuit;

and control means regulated by the control signal of the second time-cycle controller to regulate the size of the portion of the main flow stream diverted into the third circuit.

17. The method of recovering condensable hydrocarbons from a main flow stream of natural gas which includes;

contacting a first bed of adsorbed material with the main flow stream of natural gas, whereby condensable hydrocarbons are adsorbed by the bed material;

heating a reactivation flow stream of natural gas, whereby the vaporizing capacity of the reactivating flow stream is raised;

contacting the first bed of adsorbent material with the heated reactivation flow stream while diverting the main flow stream to a second bed of adsorbent material;

cooling the reactivation flow stream to its dew point, whereby condensable hydrocarbons vaporized from the beds are removed and recovered;

diverting at least a portion of the main flow stream after the stream has hydrocarbons adsorbed from it by a bed of adsorbent material;

cooling the first bed of adsorbent material with the diverted portion of the main flow stream while contacting the second bed of adsorbent material with the heated reactivation flow stream while diverting the main flow stream to a third bed of adsorbent material;

returning the diverted portion of the main flow stream to the undiverted remainder of the main flow stream;

sensing the temperature of the main flow stream after the diverted portion has cooled the first bed and returned to the main flow stream;

sensing the flow of the diverted portion of the main flow stream;

utilizing the temperature of the mixture of the main flow stream and diverted portion and the flow of the diverted portion to regulate a differential pressure in the main flow stream to control the size of the diverted portion of the main flow stream which cools the first bed;

and returning the first bed to processing the main flow stream while the second bed is cooled with the diverted portion of the main flow stream and the third bed is contacted with the heated reactivation flow stream.

18. A system for recovering condensable hydrocarbons from a main flow stream of natural gas which includes;

a first bed of adsorbent material;

a first circuit for the main flow stream of natural gas connected to the first bed of adsorbent material, whereby the natural gas passing through the bed has its condensable hydrocarbons retained by the bed;

a second circuit for a reactivation flow stream of gas;

a heater for the reactivation flow stream;

a second bed of adsorbent material;

means for disconnecting the first circuit from the first bed and connecting the second circuit to the first bed, whereby the heated reactivation flow stream vaporizes the condensable hydrocarbons from the first bed;

means for cooling the reactivation flow stream in the second circuit after the heated stream has flowed through the first bed down to the dew point of the stream, whereby condensable hydrocarbons vaporized from the beds are removed and recovered;

a third circuit connected to the first circuit across a modulating valve in the first circuit which valve is located in the first circuit downstream of the connection of the first circuit with the beds;

a third bed of adsorbent material;

means for disconnecting the second circuit from the first bed and connecting the third circuit with the first bed while disconnecting the first circuit from the second bed and connecting the second circuit with the second bed while connecting the first circuit with the third bed, whereby the first bed is cooled and thereby prepared for connection to the first circuit to remove hydrocarbons from the main flow stream by adsorption;

temperature responsive means in the first circuit downstream of the connection across the modulating valve in the first circuit;

flow responsive means in the third circuit;

a flow-temperature controller adjusted by the flow responsive means and temperature responsive means to develop a control signal for the modulating valve, whereby the amount of the stream in the first circuit diverted into the third circuit by the differential pressure across the modulating valve is regulated by the flow of the diverted portion of the main flow stream and by the temperature of the diverted portion of the main flow stream which cools the first bed and the undiverted portion of the main flow stream in the first circuit;

and means for reconnecting the first circuit to the first bed while the second bed is connected to the third circuit and the third bed is connected to the second circuit.

19. The method of recovering condensable hydrocarbons from a main flow stream of natural gas which includes;

contacting a bed of adsorbent material with the main flow stream of natural gas, whereby condensable hydrocarbons are adsorbed by the bed material;
heating a reactivation flow stream of natural gas, whereby the vaporizing capacity of the reactivating flow stream is raised;
contacting the bed of adsorbent material with the heated reactivation flow stream;
cooling the reactivation flow stream to its dew point, whereby condensable hydrocarbons vaporized from the bed are recovered;
diverting at least a portion of the main flow stream after the stream has hydrocarbons adsorbed from it;
cooling the bed with the diverted portion of the main flow stream, whereby the bed is prepared to be again contacted with the main flow stream of natural gas to remove hydrocarbons from the main flow stream by adsorption;
returning the diverted portion of the main flow stream to the undiverted remainder of the main flow stream;
sensing the temperature of the main flow stream after the diverted portion has been returned to the undiverted remainder of the main flow stream;
sensing the flow of the diverted portion of the main flow stream;
and utilizing the temperature of the mixture of the main flow stream and diverted portion and the flow of the diverted portion to regulate a differential pressure in the main flow stream to control the size of the diverted portion of the main flow stream which cools the bed.

20. A system for recovering condensable hydrocarbons from a main flow stream of natural gas which includes;
a bed of adsorbent material;
a first circuit for the main flow stream of natural gas including the bed of adsorbent material, whereby the natural gas passing through the bed has its condensable hydrocarbons retained by the bed;
a second circuit for a reactivation flow stream of gas;
a heater for the reactivation flow stream;
means for including the bed of adsorbent material in the second circuit after the bed has removed condensable hydrocarbons from the main flow stream;
means for cooling the reactivation flow stream after it has flowed in the second circuit from the bed until the dew point of the stream is reached and recovery of the condensable hydrocarbons is made;
a third circuit for diverting at least a portion of the main flow stream after the stream has hydrocarbons adsorbed from it;
means for including the bed of adsorbent material in the third circuit to cool the bed, whereby the bed is prepared to be again contacted with the main flow stream of the first circuit to remove hydrocarbons from the stream by adsorption;
means for returning the diverted portion of the main flow stream of the third circuit to the main flow stream of the first circuit;
temperature responsive means in the first circuit downstream of the point at which the diverted portion is returned to the main flow stream of the first circuit;
flow responsive means in the third circuit;
and a flow-temperature controller adjusted by the flow responsive means and temperature responsive means to develop a control signal for the means for returning the diverted portion of the main flow stream of the third circuit to the main flow stream.

21. The method of recovering condensable hydrocarbons from a main flow stream of natural gas which includes:
contacting a first bed of adsorbed material with the main flow stream of natural gas, whereby condensable hydrocarbons are adsorbed by the bed material;
heating a recycled reactivation flow stream of natural gas, whereby the vaporizing capacity of the reactivating flow stream is raised;
contacting the first bed of adsorbent material with the heated reactivation flow stream while diverting the main flow stream to a second bed of adsorbent material;
cooling the reactivation flow stream to its dew point, whereby condensable hydrocarbons vaporized from the beds are removed and recovered;
diverting at least a portion of the main flow stream after the stream has hydrocarbons adsorbed from it by the second bed of adsorbent material;
terminating the flow of the heated reactivation stream through the first bed of adsorbent material;
cooling the first bed of adsorbent material with the diverted portion of the main flow stream, whereby the bed is prepared to be again contacted with the main flow stream of natural gas to remove hydrocarbons from the main flow stream by adsorption;
returning the diverted portion of the main flow stream to the undiverted remainder of the main flow stream;
sensing the temperature of the main flow stream after the diverted portion has been returned to the undiverted remainder of the main flow stream;
sensing the flow of the diverted portion of the main flow stream;
utilizing the temperature of the mixture of the main flow stream and diverted portion and the flow of the diverted portion to regulate a differential pressure in the main flow stream to control the size of the diverted portion of the main flow stream which cools the first bed to reduce the temperature of the first bed at a predetermined rate to that temperature which will prepare the first bed to be again contacted with the main flow stream of natural gas by the time the second bed is ready to be heated and cooled to regenerate it;
and returning the first bed to processing the main flow stream while the second bed is heated and cooled to regenerate it.

22. A system for recovering condensable hydrocarbons from a main flow stream of natural gas which includes:
a first bed of adsorbent material;
a first circuit for the main flow stream of natural gas connected to the first bed of adsorbent material, whereby the natural gas passing through the bed has its condensable hydrocarbons retained by the bed;
a second circuit for a reactivation flow stream of gas;
a heater for the reactivation flow stream;
a second bed of adsorbent material;
means for disconnecting the first circuit from the first bed and connecting the second circuit to the first bed while the first circuit is connected to the second bed, whereby the heated reactivation flow stream vaporizes the condensable hydrocarbons from the first bed while the main flow stream is processed by the second bed;
means for cooling the reactivation flow stream in the second circuit after the heated stream has flowed through the first bed down to the dew point of the stream;
whereby condensable hydrocarbons vaporized from the beds are removed and recovered;
a third circuit connected to the first circuit across a modulating valve in the first circuit which valve is located in the first circuit downstream of the connection of the first circuit with the beds;
means for disconnecting the second circuit from the first bed and connecting the third circuit with the first bed, whereby the first bed is cooled and thereby prepared for connection to the first circuit to remove hydrocarbons from the main flow stream by adsorption;
temperature responsive means in the first circuit downstream of the connection of the third circuit to the first circuit;
flow responsive means in the third circuit;

a flow-temperature controller adjusted by the flow responsive means and temperature responsive means to develop a control signal for the valve in the first circuit to regulate the size of the portion of the main flow stream diverted into the third circuit;

and means for disconnecting the third circuit from the first bed and reconnecting the first circuit to the first bed while the second bed is disconnected from the first circuit and connected to the second and third circuits.

References Cited in the file of this patent

UNITED STATES PATENTS

| | | |
|---|---|---|
| 2,799,362 | Miller | July 16, 1957 |
| 2,957,544 | Baker | Oct. 25, 1960 |